US007773264B2

(12) United States Patent
Kai-Cheng

(10) Patent No.: US 7,773,264 B2
(45) Date of Patent: Aug. 10, 2010

(54) APPARATUS FOR CONVERTING GRAY SCALE AND METHOD FOR THE SAME

(75) Inventor: Chan Kai-Cheng, Sinjhuang (TW)

(73) Assignee: ICP Electronics, Inc., Shi-Chih, Taipei Hsien (TW)

( * ) Notice: Subject to any disclaimer, the term of this patent is extended or adjusted under 35 U.S.C. 154(b) by 661 days.

(21) Appl. No.: 11/717,200

(22) Filed: Mar. 13, 2007

(65) Prior Publication Data

US 2008/0158609 A1 Jul. 3, 2008

(30) Foreign Application Priority Data

Dec. 27, 2006 (TW) .............................. 95149298 A

(51) Int. Cl.
*H04N 1/40* (2006.01)

(52) U.S. Cl. ........................................ 358/2.1; 358/504

(58) Field of Classification Search .................. 358/1.9, 358/2.1, 500, 516–520, 523, 504
See application file for complete search history.

(56) References Cited

U.S. PATENT DOCUMENTS 6,614,448 B1 * 9/2003 Garlick et al. .............. 345/605
6,727,879 B2 * 4/2004 Sako ........................... 345/98

* cited by examiner

*Primary Examiner*—Thomas D Lee
*Assistant Examiner*—Stephen M Brinich
(74) *Attorney, Agent, or Firm*—Winston Hsu

(57) ABSTRACT

The invention discloses an apparatus for converting gray scale. The apparatus includes a receiving module, an encoding module, and a decoding module. The receiving module is used for receiving an input image, wherein the input image has an N-bit first gray level. The encoding module is used for selectively calculating a first color level based on both M higher bits and T lower bits of the first gray level, and then calculating a second color level and a third color level based on M higher bits of the first gray level. The decoding module is used for converting the first, second, and third color levels into an N-bit second gray level by using a gray scale conversion formula.

14 Claims, 2 Drawing Sheets

APPARATUS FOR CONVERTING GRAY SCALE AND METHOD FOR THE SAME

BACKGROUND OF THE INVENTION

1. Field of the invention

The invention relates to a gray scale conversion apparatus and method for the same and, more particularly, to an apparatus capable of converting gray scale of an input image and method for the same.

2. Description of the Prior Art

In general, the main function of a graphic card is to convert signals outputted by a computer into images, and then it enables the monitor to display the images on the exact location. In other words, the input image is converted into a control signal by the graphic card and then is transmitted to the monitor. Consequently, the figure and color can be displayed on the screen.

In the prior art, if the input image is a 10-bit image, a 10-bit pro graphic card will be required for converting the 10-bit image into a control signal with color and figure. And, if the input image is a 12-bit image, a 12-bit pro graphic card will be required for converting the 12-bit image into a control signal with color and figure, and so on. However, since the price of a pro graphic card is higher than a general one, the cost of a computer will be increased.

Therefore, the scope of the invention is to provide an apparatus for converting gray scale and method for the same to solve the aforesaid problems.

SUMMARY OF THE INVENTION

An object of the invention is to provide an apparatus for converting gray scale and method for the same. No matter the gray level of an input image is how many bits (e.g. 8-bit, 10-bit, 12-bit, etc.), any input image can be converted by a general graphic card.

According to a preferable embodiment, the gray scale conversion apparatus of the invention comprises a receiving module, an encoding module, and a decoding module. The receiving module is used for receiving an input image, wherein the input image has an N-bit first gray level, and N is a natural number. The encoding module is used for selectively calculating a first color level based on both M higher bits and T lower bits of the first gray level, and then calculating a second color level and a third color level based on the M higher bits of the first gray level, wherein both M and T are natural numbers, and the sum of M and T is N. The decoding module is used for converting the first, second, and third color levels into an N-bit second gray level by using a gray scale conversion formula.

In this embodiment, the first, second, and third color levels calculated by the decoding module can be converted into control signals by a general graphic card. Then, the decoding module can convert the control signals into the N-bit second gray level. Finally, the input image can be displayed on the display device with N-bit gray level.

The advantage and spirit of the invention may be understood by the following recitations together with the appended drawings.

BRIEF DESCRIPTION OF THE APPENDED DRAWINGS

DETAILED DESCRIPTION OF THE INVENTION

The invention provides an apparatus for converting gray scale of an input image in electronic equipment (e.g. computer, etc.). No matter how many bits of the gray level of the input image are (e.g. 8-bit, 10-bit, 12-bit, etc.), the input image can always be converted by a general graphic card.

Figure 1:
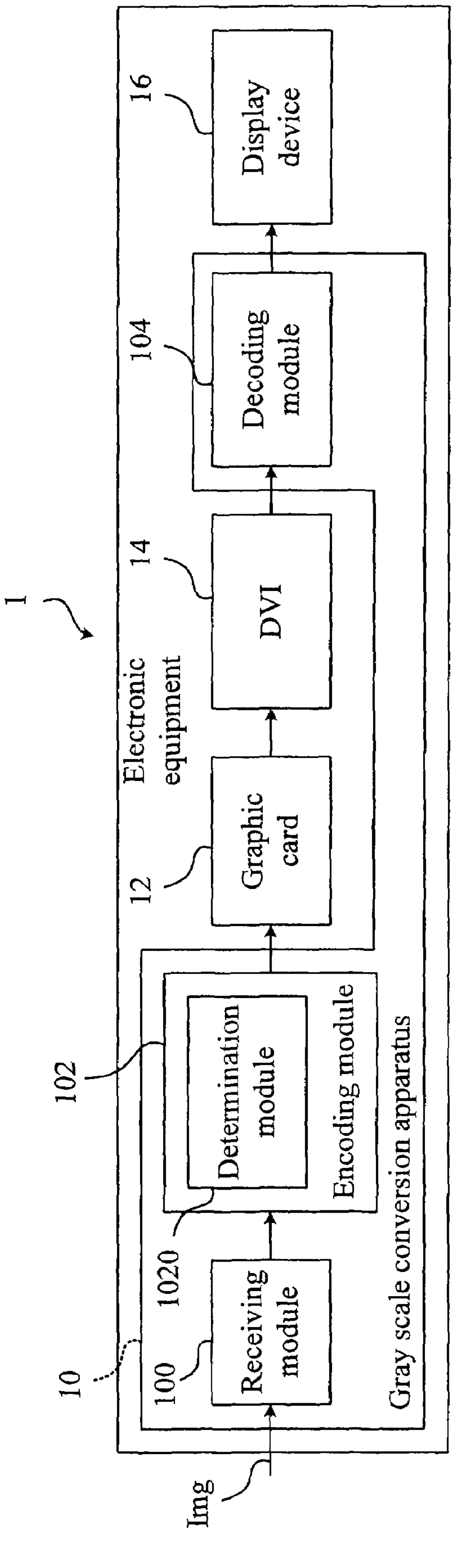
FIG. 1 depicts a functional block diagram illustrating a gray scale conversion apparatus of the invention applied to electronic equipment.

Referring to FIG. 1, a gray scale conversion apparatus 10 of the invention is applied to electronic equipment 1. The electronic equipment 1 comprises the gray scale conversion apparatus 10, a graphic card 12, a digital video interface (DVI) 14, and a display device 16. The gray scale conversion apparatus 10 of the invention comprises a receiving module 100, an encoding module 102, and a decoding module 104. The encoding module 102 comprises a determination unit 1020. In particular, any types of the graphic cards and the DVIs are suitable for the invention.

As shown in FIG. 1, the receiving module 100 is used for receiving an input image Img, wherein the input image Img has N-bit gray level, and N is a natural number. In this embodiment, the gray level of the input image Img is 10-bit, i.e. N is 10.

The encoding module 102 is used for selectively calculating a first color level based on both M higher bits and T lower bits of the gray level of the input image Img, and then for calculating a second color level and a third color level based on the M higher bits, wherein both M and T are natural numbers, and the sum of M and T is N. In practical applications, the first color level can be blue level, the second color level can be green level, and the third color level can be red level; the first color level can be red level, the second color level can be blue level, and the third color level can be green level; or the first color level can be green level, the second color level can be red level, and the third color level can be blue level. In this embodiment, the first color level is red level, the second color level is blue level, and the third color level is green level.

Furthermore, since the color level is represented by 8-bit in general, in this embodiment, the former 8 bits of the 10-bit gray level of the input image Img are higher bits (i.e. M is 8), and the last 2 bits are lower bits (i.e. T is 2).

When the input image Img is transmitted from the receiving module 100 to the encoding module 102, the determination unit 1020 determines whether the gray level $Y_1$ of the input image ing is under a threshold value ($2^{N-1}$). If it is YES, the determination unit 1020 will calculate gray level $Y_3$, red level $C_1$, blue level $C_2$, and green level $C_3$ by Formula 1. However, if it is NO, the determination unit 1020 will calculate gray level $Y_4$, red level $C_1$, blue level $C_2$, and green level $C_3$ by Formula 2. In this embodiment, N is 10, and the threshold value is 512 ($2^9$).

$$\text{Formula 1:}\begin{cases} Y_3 = Y_1 * \dfrac{(2^{N-1}-1)-X_1}{2^{N-1}} \\ C_1 = Y_3[M] + Y_3[T] \\ C_2 = Y_3[M] \\ C_3 = Y_3[M] \end{cases}.$$

-continued $$\text{Formula 2:}\begin{cases} Y_4 = (Y_1 - 2^{N-1}) * \frac{(2^{N-1}-1)-X_2}{2^{N-1}} + 1 + 2^{N-1} \\ C_1 = Y_4[M] - (2^{N-M} - 1 - Y_4[T]) \\ C_2 = Y_4[M] \\ C_3 = Y_4[M] \end{cases}.$$

In Formula 1 and Formula 2, $X_1$ represents a first predetermined value, $X_2$ represents a second predetermined value, the sum of $X_1$ and $X_2$ is $2^{(N-M)}-1$, $Y_3[M]$ represents M higher bits of the gray level $Y_3$, $Y_3[T]$ represents T lower bits of the gray level $Y_3$, $Y_4[M]$ represents M higher bits of the gray level $Y_4$, and $Y_4[T]$ represents T lower bits of the gray level $Y_4$. In this embodiment, N is 10, M is 8, T is 2, $X_1$ is 2, $X_2$ is 1, and then formula 1 and formula 2 can be changed as follows.

$$\text{Formula 1:}\begin{cases} Y_3 = Y_1 * \frac{511-2}{511} \\ C_1 = Y_3[9:2] + Y_3[1:0] \\ C_2 = Y_3[9:2] \\ C_3 = Y_3[9:2] \end{cases}.$$

$$\text{Formula 2:}\begin{cases} Y_4 = (Y_1 - 512) * \frac{511-1}{511} + 1 + 512 \\ C_1 = Y_4[9:2] - (3 - Y_4[1:0]) \\ C_2 = Y_4[9:2] \\ C_3 = Y_4[9:2] \end{cases}.$$

For example, the gray level $Y_1$ of the input image Img is 511 represented by 10-bit as [0 1 1 1 1 1 1 1 1 1]. Because $Y_1$ (511) is under 512, the determination unit 1020 calculates the gray level $Y_3$ and obtains its value "509" (if there is remainder, take the integer) by the formula 1, wherein the gray level $Y_3$ (509) is represented by 10-bit as [0 1 1 1 1 1 1 1 0 1]; and then calculates the red level $C_1$, the blue level $C_2$, and the green level $C_3$, to respectively obtain its value "128" which is sum of 127 (represented by 8-bit as [0 1 1 1 1 1 1 1]) and 1 (represented by 8-bit as [0 0 0 0 0 0 0 1]), "127" (represented by 8-bit as [0 1 1 1 1 1 1 1]), and "127" (represented by 8-bit as [0 1 1 1 1 1 1 1]).

Afterward, the red level $C_1$, the blue level $C_2$, and the green level $C_3$ are transmitted to the decoding module 104 via the graphic card 12 and the DVI 14. The decoding module 104 converts the red level $C_1$, the blue level $C_2$, and the green level $C_3$ into a 10-bit gray level $Y_2$ by using a gray scale conversion formula. In this embodiment, the gray scale conversion formula is represented as Formula 3.

$$Y_2=(a*C_1+b*C_2+c*C_3)*2^{N-M}. \quad \text{Formula 3:}$$

In Formula 3, a is $$\frac{1}{2^{N-M}},$$

and the sum of b and c is $$1-\frac{1}{2^{N-M}}.$$

In this embodiment, N is 10, M is 8, b is 0.586, and c is 0.164, thus, Formula 3 can be changed as follows.

$$Y_2=(0.25*C_1+0.586*C_2+0.164*C_3)*4. \quad \text{Formula 3:}$$

Therefore, if the red level $C_1$ is 128, the blue level $C_2$ is 127, and the green level $C_3$ is 127, the gray level $Y_2$ will be 509.

Afterward, the input image Img can be displayed on the display device 16 with 10-bit gray level $Y_2$ (509).

Figure 2:
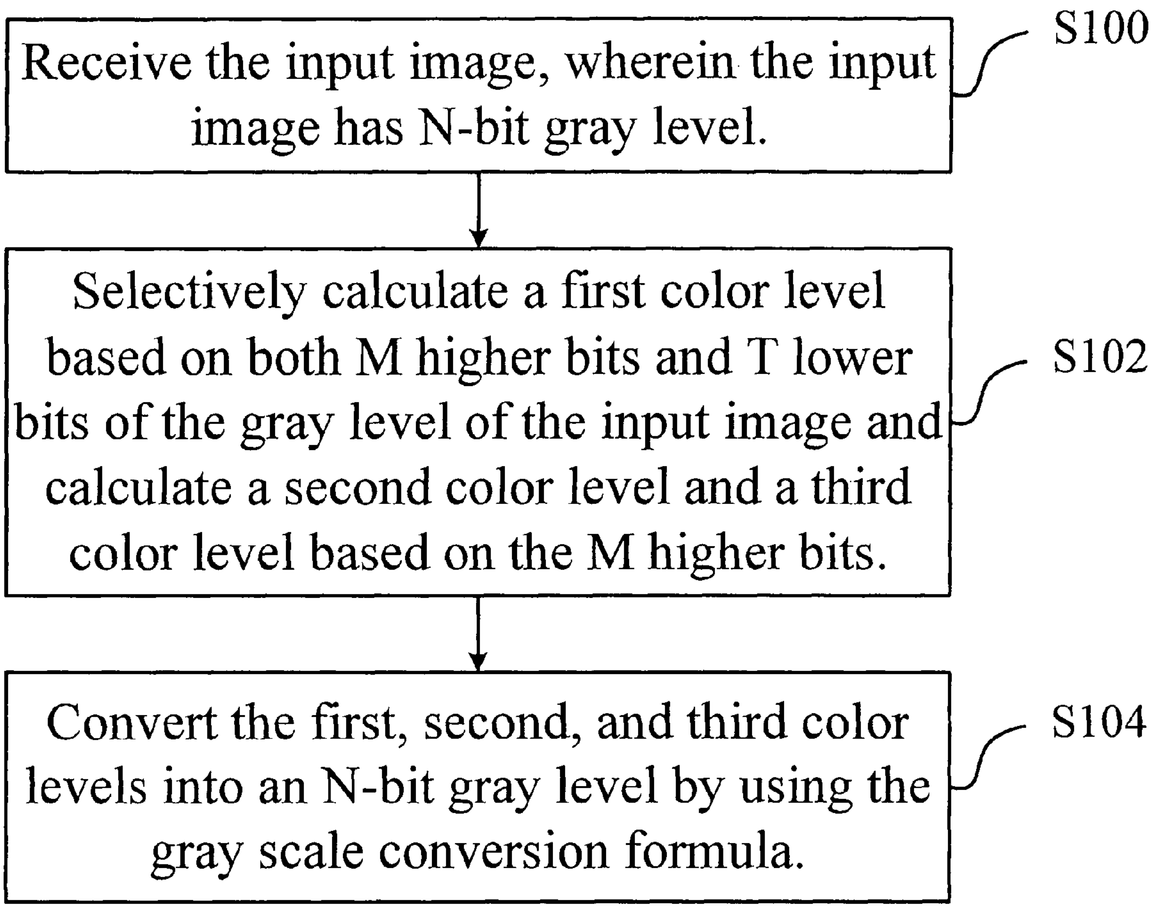
FIG. 2 depicts a flowchart showing the gray scale conversion method according to a preferred embodiment of the invention.

Referring to FIGS. 1 and 2 again, according to the aforesaid embodiment, the method of the invention comprises the following steps. For a start, step S100 is performed to receive the input image Img, wherein the input image img has N-bit gray level. Then, step S102 is performed to selectively calculate a first color level based on both M higher bits and T lower bits of the gray level of the input image, and then calculate a second color level and a third color level based on the M higher bits. Finally, Step S104 is performed to convert the first, second, and third color levels into an N-bit gray level by using the aforesaid gray scale conversion formula. The detailed function and principle of the method have been described in the above and are not necessary to mention again.

Compared to the prior art, the red, blue, and green levels calculated by the encoding module of the gray scale conversion apparatus of the invention can be converted into control signals by general graphic card. Afterward, the control signals are transmitted to the decoding module and are further converted into a gray level having the same number of bits as the original gray level. Accordingly, the input image can be converted to a control signal by any general graphic card instead of a pro graphic card, so as to reduce the cost.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An apparatus for converting gray scale comprising:

a receiving module for receiving an input image having an N-bit first gray level, N being a natural number;

an encoding module for selectively calculating a first color level based on both M higher bits and T lower bits of the first gray level, and then calculating a second color level and a third color level based on the M higher bits of the first gray level, wherein both M and T are natural numbers, and the sum of M and T is N; and a decoding module for converting the first, second, and third color levels into an N-bit second gray level by using a gray scale conversion formula.

2. The apparatus of claim 1, wherein the first color level is blue level, the second color level is green level, and the third color level is red level.

3. The apparatus of claim 1, wherein the first color level is red level, the second color level is blue level, and the third color level is green level.

4. The apparatus of claim 1, wherein the first color level is green level, the second color level is red level, and the third color level is blue level.

5. The apparatus of claim 1, wherein the encoding module comprises:

a determination unit for determining whether the first gray level is under a threshold value; if YES, the determination unit calculating a third gray level, the first color level, the second color level, and the third color level by the following Formula 1, or else the determination unit calculating a fourth gray level, the first color level, the second color level, and the third color level by the following Formula 2, $$\text{Formula 1:}\begin{cases} Y_3 = Y_1 * \dfrac{(2^{N-1}-1)-X_1}{2^{N-1}} \\ C_1 = Y_3[M] + Y_3[T] \\ C_2 = Y_3[M] \\ C_3 = Y_3[M] \end{cases},$$

$$\text{Formula 2:}\begin{cases} Y_4 = (Y_1 - 2^{N-1}) * \dfrac{(2^{N-1}-1)-X_2}{2^{N-1}} + 1 + 2^{N-1} \\ C_1 = Y_4[M] - (2^{N-M} - 1 - Y_4[T]) \\ C_2 = Y_4[M] \\ C_3 = Y_4[M] \end{cases};$$

wherein $Y_1$ represents the first gray level, $Y_3$ represents the third gray level, $Y_4$ represents the fourth gray level, $C_1$ represents the first color level, $C_2$ represents the second color level, $C_3$ represents the third color level, $X_1$ represents a first predetermined value, $X_2$ represents a second predetermined value, the sum of $X_1$ and $X_2$ is equal to $2^{(N-M)}-1$, $Y_3[M]$ represents M higher bits of the third gray level, $Y_3[T]$ represents T lower bits of the third gray level, $Y_4[M]$ represents M higher bits of the fourth gray level, and $Y_4[T]$ represents T lower bits of the fourth gray level.

6. The apparatus of claim 5, wherein the threshold value is $2^{N-1}$.

7. The apparatus of claim 1, wherein the gray scale conversion formula is represented by $Y_2=(a*C_1+b*C_2+c*C_3)*2^{N-M}$, $Y_2$ represents the second gray level, a is $$\frac{1}{2^{N-M}},$$

and the sum of b and c is $$1-\frac{1}{2^{N-M}}.$$

8. A method for converting gray scale, comprising steps of:

(a) receiving an input image having an N-bit first gray level, N being a natural number;

(b) selectively calculating a first color gray level based on M higher bits and T lower bits of the first gray level and then calculating a second color level and a third color level based on the M higher bits of the first gray level, wherein both M and T are natural numbers, and the sum of M and T is N; and (c) converting the first, second, and third color levels into an N-bit second gray level by using a gray scale conversion formula.

9. The method of claim 8, wherein the first color level is blue level, the second color level is green level, and the third color level is red level.

10. The method of claim 8, wherein the first color level is red level, the second color level is blue level, and the third color level is green level.

11. The method of claim 8, wherein the first color level is green level, the second color level is red level, and the third color level is blue level.

12. The method of claim 8, wherein step (b) comprises steps of:

(b1) determining whether the first gray level is under a threshold value, if YES, performing step (b2), or else performing step (b3);

(b2) calculating a third gray level, the first color level, the second color level, and the third color level by the following Formula 1, $$\text{Formula 1:}\begin{cases} Y_3 = Y_1 * \dfrac{(2^{N-1}-1)-X_1}{2^{N-1}} \\ C_1 = Y_3[M] + Y_3[T] \\ C_2 = Y_3[M] \\ C_3 = Y_3[M] \end{cases};$$

(b3) calculating a fourth gray level, the first color level, the second color level, and the third color level by the following Formula 2, $$\text{Formula 2:}\begin{cases} Y_4 = (Y_1 - 2^{N-1}) * \dfrac{(2^{N-1}-1)-X_2}{2^{N-1}} + 1 + 2^{N-1} \\ C_1 = Y_4[M] - (2^{N-M} - 1 - Y_4[T]) \\ C_2 = Y_4[M] \\ C_3 = Y_4[M] \end{cases};$$

wherein $Y_1$ represents the first gray level, $Y_3$ represents the third gray level, $Y_4$ represents the fourth gray level, $C_1$ represents the first color level, $C_2$ represents the second color level, $C_3$ represents the third color level, $X_1$ represents a first predetermined value, $X_2$ represents a second predetermined value, the sum of $X_1$ and $X_2$ is $2^{(N-M)}-1$, $Y_3[M]$ represents M higher bits of the third gray level, $Y_3[T]$ represents T lower bits of the third gray level, $Y_4[M]$ represents M higher bits of the fourth gray level, and $Y_4[T]$ represents T lower bits of the fourth gray level.

13. The method of claim 12, wherein the threshold value is $2^{N-1}$.

14. The method of claim 8, wherein the gray scale conversion formula is represented by $Y_2=(a*C_1+b*C_2+c*C_3)*2^{N-M}$, $Y_2$ represents the second gray level, a is $$\frac{1}{2^{N-M}},$$

and the sum of b and c is $$1-\frac{1}{2^{N-M}}.$$

* * * * *